United States Patent [19]

Queneau et al.

[11] 4,443,415
[45] Apr. 17, 1984

[54] RECOVERY OF $V_2O_5$ AND NICKEL VALUES FROM PETROLEUM COKE

[75] Inventors: Paul B. Queneau, Golden; Robert F. Hogsett; Leo W. Beckstead, both of Arvada; Dale K. Huggins, Golden, all of Colo.

[73] Assignee: Amax Inc., Greenwich, Conn.

[21] Appl. No.: 391,027

[22] Filed: Jun. 22, 1982

[51] Int. Cl.$^3$ ...................... C01G 31/00; C01G 53/00
[52] U.S. Cl. .................................... 423/68; 423/150; 423/62
[58] Field of Search .................. 423/62, 68, 150

[56] References Cited

U.S. PATENT DOCUMENTS

| | | | |
|---|---|---|---|
| 3,132,920 | 5/1964 | Goren | 23/18 |
| 3,214,346 | 10/1965 | Mason et al. | 423/68 |
| 3,429,693 | 2/1969 | Bauer et al. | 75/101 |
| 3,712,942 | 1/1973 | Svejda | 423/593 |
| 3,773,890 | 11/1973 | Fox et al. | 423/68 |
| 4,100,251 | 7/1978 | Reinhardt et al. | 423/68 |
| 4,243,639 | 1/1981 | Haas et al. | 423/63 |
| 4,296,073 | 10/1981 | Maurel et al. | 423/3 |

FOREIGN PATENT DOCUMENTS 52-52896  4/1977  Japan ...................... 423/68

OTHER PUBLICATIONS

Jack et al., "Fuel", vol. 58, 1979, pp. 589-594.
Nair, et al., Research and Industry, vol. 25, Mar. 1980, pp. 1-4, "Recovery of Vanadium from Acidic Waste...".
Hollis, et al., "Precipitation of Red Cake from Low Vanadium Acid Sulfate Leach Liquors", Topical Report ACCO-45 (U.S. Gov't. Report).

Primary Examiner—Herbert T. Carter
Attorney, Agent, or Firm—Michael A. Ciomek

[57] ABSTRACT

Vanadium and nickel values are selectively recovered from a petroleum coke residue by slurrying the coke in an aqueous solution of sodium carbonate providing an excess of the stoichiometric amount of sodium for formation of sodium vanadate and sodium sulfate, and then digesting the slurry at moderately elevated temperature in a pressurized autoclave under an oxygen overpressure supplying at least the stoichiometric amount of oxygen based on the vanadium and sulfur content of the slurry and advantageously sufficient additional oxygen to provide the thermal requirements of the digestion step by oxidation of carbon. In a continuous embodiment, the feed slurry temperature and feed solids content are adjusted according to a substantially inversely correlated relationship. The digestion temperature for a given total pressure and gas flow rate in the autoclave is adjusted to generate a pregnant liquor containing about 20 gpl to about 100 gpl of vanadate ($V_2O_5$) from which at least about 50% of the input water has been converted to steam during the digestion. The vanadate liquor is separated from the digestion residue, which is then sequentially selectively leached for recovery therefrom of nickel and residual vanadium values.

8 Claims, 1 Drawing Figure

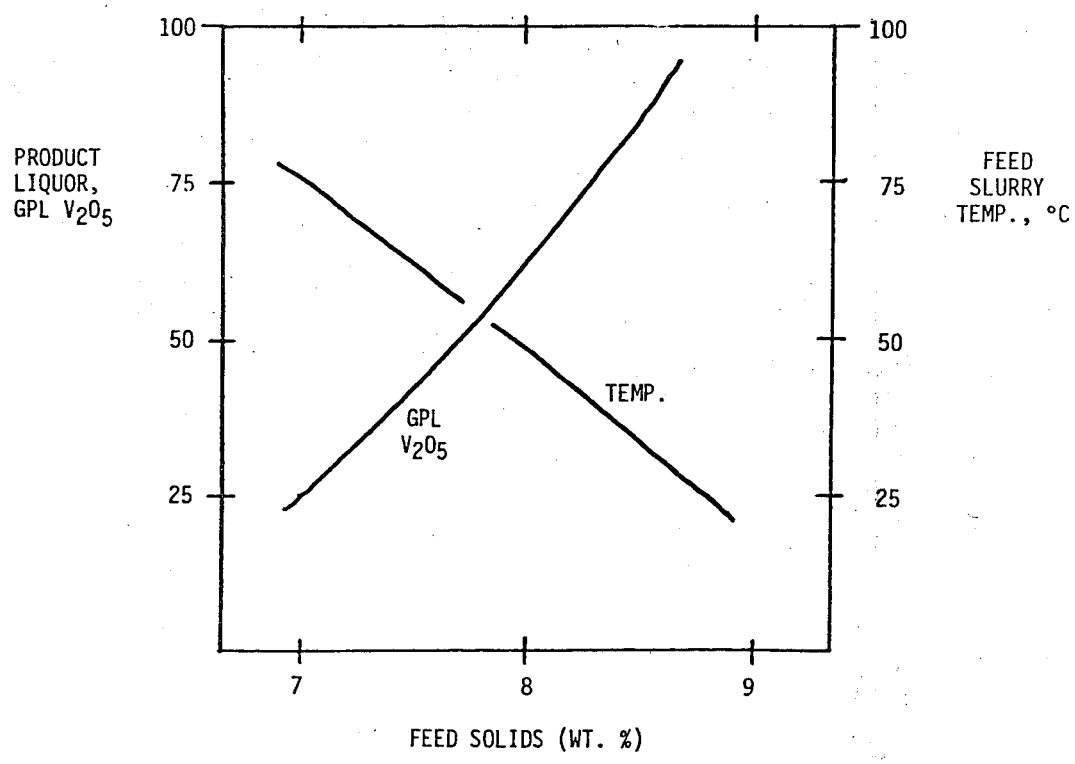

RECOVERY OF V₂O₅ AND NICKEL VALUES FROM PETROLEUM COKE

BACKGROUND OF THE INVENTION

1. Field of the Invention

The present invention relates to the treatment of petroleum coke containing therein valuable metals, particularly vanadium and nickel. Petroleum coke is a material of low volatility produced during the refining of crude oil and generally comprises carbonaceous material including elemental carbon, as well as relatively heavy hydrocarbon products including straight- and branched-chain saturated and unsaturated hydrocarbons, cyclic and polycyclic saturated and unsaturated hydrocarbons, whether unsubstituted or substituted with acyl, cyano, sulfur, or halogen constituents, and organometallic compounds. As used herein, the term "carbonaceous material" will mean elemental carbon, hydrocarbons and mixtures thereof. Petroleum coke that can be treated in this invention includes not only conventional petroleum coke produced by refining operations such as cracking, reforming, and the like of crude oil and tars, but also residues remaining after conventional petroleum coke is subjected to secondary treatment to recover some of the hydrocarbon content of the coke as gaseous or liquid products.

During the refining of crude oil, compounds of vanadium and nickel in the crude oil can concentrate in the petroleum coke, which thereby represents a potentially valuable source of these metals. Vanadium and nickel have many commercial uses, particularly as alloying elements of steel. Various processes have been proposed in which these metal values are concentrated or recovered from a variety of feed materials, but such processes often suffer from one or more drawbacks including unacceptably low yields, excessive consumption of energy, difficulty of separating the various constituent metals from the metal-bearing product fraction, and generation of undesirable compounds in waste effluents.

2. Description of the Prior Art

Several patents describe processes for treating vanadium-bearing ore with alkaline reagents to form alkaline vanadate solutions, but the disclosed processes do not suggest the treatment of metal-bearing material which is predominantly carbonaceous, nor do they suggest the treatment of such material in a controlled process that generates its own energy requirements and recovers selectively therefrom both vanadium and nickel in separate product streams.

For instance, U.S. Pat. No. 4,296,073 describes a process in which an ore of uranium, vanadium, and/or molybdenum is mixed with an aqueous liquor containing a major amount of sodium bicarbonate and only a minor amount of sodium carbonate, and the mixture is digested under an oxygen pressure of 0.1 to 20 bars (i.e., about 0.1 to about 20 kg/cm²) at a temperature of 160° C. to 300° C. The disclosure is particularly concerned with ores having a relatively high proportion of carbonate compounds but only well under 1% of organic carbon; indeed, the patentee states that such organic compounds can advantageously be removed from the metal-bearing material by a calcining step prior to the disclosed leaching treatment. In addition, the feed material contains only 0.01% or less of vanadium (as $V_2O_5$).

U.S. Pat. No. 3,712,942 discloses the extraction of vanadium from raw material containing $V_2O_3$ or another insoluble form of vanadium by leaching the raw material with a caustic solution containing 250 to 400 gpl of $Na_2O$ or $K_2O$ at a temperature of at least 250° C. under an oxygen or compressed air pressure of at least about 120 atmospheres (about 124 kg/cm²). The vanadium in the raw material is oxidized to a soluble vanadate species and dissolves in the leaching solution. The disclosure does not relate to the recovery of any other metal, such as nickel, from the vanadium-bearing feed material, nor does it suggest the treatment of feed material containing any quantity of carbonaceous matter.

U.S. Pat. No. 3,429,693 discloses a process for extracting vanadium from ores and concentrates thereof by leaching the feed material with an aqueous solution up to 50% of which is an equimolar mixture of sodium carbonate and sodium bicarbonate, at a temperature of 60° C. to 250° C. for 30 to 480 minutes. The patentee discloses that the ore should be preliminarily roasted to convert the vanadium to its fully oxidized state ($V_2O_5$). There is no disclosure of the presence of carbonaceous matter in the ore, but one would expect the amount to be at most quite small.

U.S. Pat. No. 3,132,920 discloses converting a hydrated oxide of tetravalent vanadium contaminated with iron, aluminum and manganese to pentavalent vanadate by leaching the hydrated oxide in an alkaline liquor while passing an oxidizing gas through the liquor. There is no recognition of the effect of iron on the extraction yield, and since there is no disclosure that carbonaceous matter is present in the starting material, there is no recognition of how to treat such matter. In addition, the patentee states that alkali carbonate is not as effective as alkali hydroxides.

U.S. Pat. No. 4,243,639 discloses the gasification of petroleum coke in the presence of an alkali metal salt such as sodium carbonate at a temperature above about 1000° F. (i.e., above about 538° C.) to produce a hydrocarbon gas stream and a residue containing water-leachable alkali metal vanadate. This process operates with essentially no liquid water phase, whereas as will be seen below, the process of the present invention requires the presence of a liquid water phase. The disclosed process also achieves little, if any, oxidation of the carbon in the petroleum coke starting material, and leaves a hydrocarbon residue from which the vanadium values still must be extracted.

SUMMARY OF THE INVENTION

Stated broadly, the present invention is a process for recovering vanadium and nickel values from petroleum coke comprising carbonaceous matter assaying at least about 50 wt. % carbon and also containing vanadium, at least a portion of which is in an oxidation state no higher than trivalent, iron, in an amount less than about 10% by weight of the vanadium as $V_2O_5$, and nickel values, as well as one or more compounds of sulfur, comprising (a) establishing a slurry of the coke in an aqueous solution of sodium carbonate in an amount to provide an excess of sodium over the stoichiometric amount for formation of $NaVO_3$ and $Na_2SO_4$, (b) digesting the slurry at a digestion temperature of about 250° C. to about 320° C. under an oxygen overpressure comprising at least the stoichiometric amount of oxygen for oxidation of the sulfur to sulfate and of the vanadium in the trivalent or lower state to the pentavalent state, to form an aqueous sodium vanadate liquor containing at least about 75% of the vanadium values fed in the slurry and a digestion residue containing vanadium, iron, and nickel values as well as any unoxidized carbonaceous matter, (c) separating the sodium vanadate liquor from the digestion residue, (d) selectively leaching vanadium values from the digestion residue, thereby providing a vanadate leach liquor and a first leach residue, (e) filtering the vanadate leach liquor from the first leach residue, (f) selectively leaching nickel values from the first leach residue, thereby providing a nickel leach liquor and a second leach residue, and (g) filtering the nickel leach liquor from the second leach residue.

The applicants have also discovered a continuous process for recovering vanadium and nickel values from petroleum coke comprising carbonaceous matter having a fuel value of at least about 5000 kcal/kg of coke and also containing vanadium, at least a portion of which is in an oxidation state no higher than trivalent, iron, in an amount less than about 10% by weight of the vanadium as $V_2O_5$, and nickel values, as well as one or more compounds of sulfur, comprising (a) establishing a slurry of the coke in an aqueous solution of sodium carbonate in an amount to provide an excess of sodium over the stoichiometric amount for formation of $NaVO_3$ and $Na_2SO_4$, (b) feeding the slurry to an autogenously heated autoclave to which oxygen-bearing gas is fed and from which an off-gas stream is withdrawn at rates effective to provide in the autoclave an oxygen partial pressure of about 0.07 kg/cm$^2$ to about 70 kg/cm$^2$ and a given total pressure of about 40 kg/cm$^2$ to about 200 kg/cm$^2$, (c) digesting the slurry in said autoclave at a digestion temperature of about 250° C. to about 320° C. to oxidize at least a portion of the carbonaceous matter in the slurry to form gaseous oxides of carbon and to oxidize the vanadium in the trivalent or lower state to the pentavalent state, thereby dissolving at least about 75% of the vanadium values in the coke as a sodium vanadate liquor and forming a digestion residue containing vanadium, iron, and nickel values as well as any unoxidized carbonaceous matter, wherein the digestion temperature is adjusted by adjusting the solids content of the slurry established in step (a) to about 10 to about 300 grams of solids per liter of slurry and adjusting the temperature of the slurry established in step (a) to about 5° C. to about 95° C., wherein said slurry temperature is substantially inversely correlated to the slurry solids content, to convert at least about 50% of the water fed in the slurry to steam and to provide that the sodium vanadate liquor contains about 20 gpl to about 100 gpl of vanadium as $V_2O_5$, (d) separating the sodium vanadate liquor from the digestion residue, (e) selectively leaching vanadium values from the digestion residue, thereby providing a vanadate leach liquor and a first leach residue, (f) filtering the vanadate leach liquor from the first leach residue, (g) selectively leaching nickel values from the first leach residue, thereby providing a nickel leach liquor and a second leach residue, and (h) filtering the nickel leach liquor from the second leach residue.

DESCRIPTION OF THE DRAWING

The FIGURE is a graph illustrating the effect of changing feed solids content on the feed temperature and product vanadate concentration determined for a continuously operated embodiment of the invention.

DETAILED DESCRIPTION OF THE INVENTION

The present invention treats petroleum coke which comprises carbonaceous matter (that is, carbon, hydrocarbons, and mixtures thereof) and also contains vanadium, nickel, and iron values, as well as lesser amounts of other incidental contaminants. The carbonaceous matter in the coke treated in the present invention should contain an amount of carbon, as hydrocarbons plus free carbon, assaying at least about 50 wt. %, and more advantageously about 75 wt. %, of the petroleum coke. For satisfactory operation within the constraints of the controlled, autogenously heated continuous process of the present invention, the carbonaceous matter should have a fuel value of at least about 5000 kcal/kg, and more advantageously at least about 6000 kcal/kg. As used herein, the term "fuel value" means the amount of heat liberated by the complete reaction of a given coke sample to form water and carbon dioxide.

The amount of vanadium contained in the petroleum coke treated in the present invention can vary widely from about 1 wt. % (as $V_2O_5$) ranging up to amounts as high as 20 wt. % (as $V_2O_5$) of the coke or higher. The expression "as $V_2O_5$" used herein means "expressed as $V_2O_5$". Petroleum coke containing about 5 wt. % to about 15 wt. % vanadium (as $V_2O_5$) can readily be treated according to the present process. At least a portion of the vanadium in the petroleum coke feed material is in an oxidation state no higher than trivalent; a common compound is $V_2O_3$, containing trivalent vanadium. Such partially reduced vanadium is not readily soluble in alkaline solutions. The advantages of the present invention can be realized by treating coke in which at least about 50%, and more advantageously at least about 90%, of the vanadium is in the trivalent or lower oxidation state.

Iron is a frequent contaminant of vanadium-bearing petroleum coke that can be treated in accordance with the present invention. The amount of iron in the coke fed to the present process should be limited because during the digestion reaction iron forms one or more compounds with vanadium which are only moderately soluble in the digestion liquor. At the concentrations normally employed in the present invention, the vanadate liquor becomes saturated with such iron-vanadium compounds, and accordingly a substantial proportion of the iron-vanadium compounds report to the digestion residue, thereby lowering the extraction yield. While the vanadium that reports to the digestion residue is not considered lost, since the residue is subsequently treated to recover the vanadium values therefrom, it has been determined that to maintain the overall extraction yield at satisfactorily high percentages the quantity of iron in the petroleum coke should be limited to comprise less than about 10%, and more advantageously less than about 3%, by weight of the vanadium (as $V_2O_5$) in the petroleum coke feed.

The petroleum coke treated in accordance with the present invention also contains nickel values, whose recovery is one object of the present invention. While the amount of nickel can vary considerably, nickel will generally be found in amounts of about 0.2 wt. % to about 2 wt. % of the petroleum coke.

The petroleum coke treated in accordance with the above processes can contain one or more compounds of sulfur, generally in amounts such that the petroleum coke comprises up to about 4 wt. % sulfur. Sulfur is rapidly oxidized to sulfate in the autoclave, forming sodium sulfate which dissolves in the sodium vanadate liquor. Accordingly, when the coke contains sulfur, the stoichiometric requirements of oxygen and alkali given herein should be calculated with respect to the combined sulfur and vanadium content, for formation of sulfate and vanadate. The coke will also contain miscellaneous impurities, which are largely inert but may be oxidizable to a small degree.

To prepare the petroleum coke for treatment by the present process, the coke is first slurried in an aqueous solution of sodium carbonate. The solids content of the slurry falls between about 10 gpl (grams of solid per liter of slurry) and about 300 gpl. Since the petroleum coke is frequently recovered as a fairly concentrated aqueous slurry, as where the coke is recovered from hydrocyclones or scrubbers, the appropriate solids content of the slurry can be attained by the addition of only a small amount of water, or even by the partial drying or filtration of the slurry as recovered from such previous apparatus. It is a particular advantage of the present invention that metal-bearing coke received for treatment as a slurry need not be dried prior to extraction of the metals; this feature represents a considerable saving of energy, time and equipment.

The amount of sodium carbonate to add to the feed slurry is determined primarily with reference to the amount of vanadium (or vanadium plus sulfur) in the petroleum coke to be treated. Sodium carbonate is a preferred reactant, because of its low cost and general availability. Other alkali carbonates or hydroxides can be employed, but are less satisfactory; this is particularly true of hydroxides, which react with carbon dioxide formed by the oxidation of carbonaceous matter and thus are converted to carbonates in the autoclave without contributing to the dissolution of vanadium. Sufficient sodium carbonate should be dissolved in the slurry to provide at least the stoichiometric amount of sodium corresponding to the formation of $NaVO_3$ and $Na_2SO_4$ in the pregnant liquor; a slight excess of at least about 5 gpl of $Na_2CO_3$, up to about 100 gpl excess, can be provided. As used hereinafter, the term "sodium vanadate" will refer collectively to any and all of the water-soluble sodium salts of oxides of pentavalent vanadium, including $NaVO_3$, $Na_3VO_4$, and $Na_4V_2O_7$.

The slurry of petroleum coke in the aqueous sodium carbonate solution is then fed to an autoclave for digestion of the coke and oxidation of the lower-valency (i.e., in the trivalent or lower oxidation state) vanadium values. The autoclave is a pressure reactor vessel of any standard design, capable of withstanding temperatures of several hundred degrees Centigrade and pressures of several thousand pounds per square inch. The reactor is preferably equipped with agitating means such as baffle plates or mechanically operated stirrers to encourage turbulence in the reactor. The reactor should be equipped to receive separate liquid and gaseous feed streams and to discharge separate liquid and gaseous product streams under pressure.

In batch operation, the slurry is then digested at a temperature of about 250° C. to about 320° C. at a total pressure of about 40 kg/cm² to about 200 kg/cm² which includes at least the stoichiometric amount of oxygen for oxidation of the vanadium which is in a trivalent or lower oxidation state to the pentavalent state and for oxidation of sulfur to sulfate. Some tetravalent vanadium compounds can form, which are soluble in the leach solution, but these are generally rapidly oxidized as well to pentavalent vanadium. Oxygen can be supplied as pure $O_2$, air, or oxygen-enriched air. It has been found that under these oxidizing conditions the oxidation of vanadium occurs preferentially over the oxidation of the carbonaceous matter despite the large excess of carbonaceous matter compared to the amount of vanadium. Thus, the digestion can be carried out under an oxygen overpressure supplying about 1.1 times, up to about 25 times, the stoichiometric requirement based on vanadium plus sulfur. Higher amounts of oxygen can be supplied, but the digestion does not need to oxidize all or even most of the carbonaceous matter to provide vanadium extractions of at least about 90% and even at least about 95%. The carbonaceous matter may under some conditions be substantially totally oxidized, e.g. 95% oxidized, but need not be; satisfactorily high vanadium extractions can be obtained even if less than about 75%, or even less than about 50%, of the carbonaceous matter is oxidized.

The digestion produces a sodium vanadate liquor and a digestion residue that contains vanadium, nickel, and iron values and any unoxidized carbonaceous matter. The liquor and the residue are recovered and treated further, for instance, in the manner described below with respect to the vanadate liquor and digestion residue obtained from the continuously operated embodiment of the present invention.

The applicants have also discovered a continuous process for recovering vanadium and nickel values from petroleum coke having the composition described hereinabove. The slurry of coke in an aqueous sodium carbonate solution is fed to an autoclave operating at a total pressure of about 40 kg/cm² to about 200 kg/cm², which includes a non-condensable gas overpressure of about 3 kg/cm² to about 140 kg/cm². For more advantageous process control, the total pressure is maintained at about 70 kg/cm² to about 175 kg/cm², and the non-condensable gas overpressure at up to about 70 kg/cm². An off-gas stream is withdrawn from the autoclave at a flow rate to maintain the given pressure. The off-gas stream contains water vapor, any inert gases such as nitrogen fed into the autoclave, and gaseous oxides of carbon, which latter term when used herein means carbon monoxide, carbon dioxide, and mixtures thereof.

The slurry fed to the autoclave is then digested at a digestion temperature of about 250° C. to about 320° C. to oxidize at least a portion of the carbonaceous matter in the petroleum coke and to oxidize the sulfur and the lower-valency vanadium (i.e., the vanadium in the trivalent or lower oxidation state) to sulfate and pentavalent vanadate. The autoclave is operated autogenously, that is, the only source of the energy required to sustain the digestion and oxidation reactions within the autoclave, besides that represented by the feed slurry composition and temperature, is the heat generated by the digestion and oxidation itself. The vanadium and sulfur values fed in the slurry are oxidized and are dissolved in the liquid phase within the autoclave to form a sodium vanadate-sodium sulfate liquor. Digestion also produces a digestion residue containing a portion of the vanadium, together with the iron and nickel values fed to the autoclave as well as any unoxidized carbonaceous matter and incidental impurities.

Advantageously, at least about 75% of the vanadium values in the coke slurry fed to the autoclave are extracted into the sodium vanadate liquor, so as to minimize the retreatment of the digestion residue to recover vanadium values. The extraction yield can be maintained at this value, or more advantageously at least about 90%, by maintaining the digestion temperature within the ranges disclosed herein, by controlling the iron content of the petroleum coke as disclosed above, and by providing at least a stoichiometric amount of sodium in the coke slurry. The degree of vanadium extraction into the sodium vanadate liquor can be increased by raising the digestion temperature or by increasing the stoichiometric excess of sodium in the feed slurry, and as described above a more pronounced effect on vanadium extraction is provided by lowering the amount of iron in the coke relative to the amount of vanadium therein.

While digestion temperatures of about 250° C. to about 320° C. provide satisfactory results when the digestion process is operated according to the considerations described herein, a minimum digestion temperature of over about 280° C. is preferred to ensure that potentially environmentally hazardous hydrocarbons such as cyclic, polycyclic, and cyano-substituted compounds are destroyed.

The digestion temperature should be adjusted to a value, in view of the given total pressure and gas flow rate in the autoclave, to provide that the sodium vanadate liquor contains about 20 gpl to about 100 gpl of vanadium as $V_2O_5$, and to provide further that at least about 50% of the water in the slurry fed to the autoclave is converted to steam. Conversion of more than 50%, e.g. at least about 75%, of the water to steam is more advantageous, since liquids handling is lessened for recovery of a given quantity of vanadium in subsequent steps. It is essential though to the proper operation of the digestion reaction that a liquid water phase always be present in the autoclave.

The digestion temperature can be adjusted to achieve these ends by adjustment of the pressure and gas flow rate in the autoclave. At a higher total pressure or a lower gas flow rate, a higher temperature is used to evaporate a given amount of water. Generally, though, these operating parameters are less readily altered by the operator in response to changing characteristics of the feed material to be treated. Accordingly, the present invention also comprises the discovery of the relationship among characteristics that are more readily adjustable, so that full advantage can be taken of the high extraction and high concentrations of vanadium in the liquor produced in the present process.

To provide the desired operating temperature for obtaining high extraction yield and high concentration in the sodium vanadate liquor, the solids content of the slurry is adjusted to comprise about 10 to about 300 grams of solids per liter of slurry, and the temperature of the slurry is adjusted to between about 5° C. and about 95° C. More advantageously, the temperature of the slurry fed to the autoclave is adjusted to about 30° C. to about 90° C., and the solids content of the slurry to about 50 gpl to about 100 gpl. The solids content and the slurry temperature are substantially inversely correlated to maintain thermal equilibrium; this correlation is exhibited in the FIGURE, which shows the vanadium concentration of the product liquor and the feed temperature as a function of the feed solids content determined for a slurry fed to an autoclave operating at 304° C., 2500 psig total pressure, 37 kg/cm² inlet $O_2$ partial pressure and 0.7 kg/cm² $O_2$ outlet partial pressure, and 4300 kg/hr air inlet flow rate, in which the coke has a fuel content of 6800 kcal/kg and contains 9.3% vanadium (as $V_2O_5$) of which over 90% is in the trivalent or lower oxidation state. To maintain equilibrium, the feed temperature must be decreased in response to increasing feed solids content, though the product liquor is then less concentrated in vanadate.

Digestion is carried out for a time sufficient to allow oxidation of carbon and oxidation and extraction of vanadium to take place. Residence times of about 60 to about 120 minutes are generally satisfactory when operating at 270° C. At 300° C., a residence time of 30 to 60 minutes is generally satisfactory.

Following digestion in either the continuously operated autoclave or the single-stage process described previously, a product slurry comprising the digestion residue slurried in the sodium vanadate liquor is recovered from the autoclave. The liquor contains a portion of the water fed to the autoclave, sodium sulfate, unreacted sodium carbonate, and miscellaneous impurities. The product slurry is filtered to separate the sodium vanadate liquor from the digestion residue. Advantageously, the sodium vanadate liquor is flashed to the atmosphere, generally before, but optionally after, filtration of the digestion residue; an additional high-energy stream of water vapor and gaseous oxides of carbon evolves from the sodium vanadate liquor, and the liquor is concentrated by at least about 10% of the concentration prior to flashing.

The sodium vanadate liquor can then be treated to precipitate dissolved silica and phosphorus-based impurities therefrom, and then acidified to lower the carbonate content thereof. The vanadium values can then be extracted from the acidified liquor into an organic extractant, leaving sodium sulfate in the barren liquor. The vanadium is then stripped from the organic extractant using an aqueous ammoniated solution from which a compound such as ammonium metavanadate is recovered. Ammonium metavanadate can then be dried and deammoniated, yielding a final purified $V_2O_5$ product.

The digestion residue recovered from the product slurry, containing nickel, iron, and vanadium values and any unoxidized carbonaceous matter, is leached with an aqueous leachant to selectively leach vanadium values therefrom. A satisfactory leachant is an aqueous solution of alkali metal hydroxides or carbonates, and particularly sodium hydroxide. The pH during this leach should be maintained at a value, advantageously above about 14, effective to dissolve vanadate while nickel and iron values are rejected from solution.

The selective leach for vanadium produces a vanadate leach liquor and a first leach residue. The vanadate leach liquor can be separated from the first leach residue, neutralized, and then subjected to the same sequence of purification steps as the sodium vanadate liquor produced in the digestion reaction. Alternatively, neutralization may be omitted and the vanadate leach liquor recycled and added to fresh slurry to be fed to the digestion reactor.

The first leach residue comprises nickel and iron values and unoxidized carbonaceous matter. This residue is then selectively leached with another aqueous leachant, preferably a mineral acid solution such as sulfuric acid, at a pH effective to permit dissolution of nickel from the first leach residue. A satisfactory pH range in the selective nickel leach is about 3 to about 6. The selective nickel leach provides a second leach residue, which can be discarded, and a nickel leach liquor which can be treated to recover the nickel values therefrom. For instance, the nickel leach liquor can be neutralized with sodium carbonate to precipitate nickel carbonate, which can be sold or used as such or can be heated to convert the nickel carbonate to nickel oxide.

The present invention thus provides a flexible and readily controllable process for forming separate product streams enriched in vanadate and in nickel, containing those metals in high yields. The process also produces simultaneously a valuable gaseous stream having a high energy content comprising steam and essentially pure oxides of carbon. The energy in this stream can be used to supply heat requirements for other associated process steps, or can be converted into mechanical or electrical energy by passing it through suitable turbines or other conversion devices. The energy in this gaseous product stream can also be used to heat the slurry fed to the autoclave when such heating is required. Furthermore, if commercial oxygen is used rather than air, the autoclave off-gases have a high carbon dioxide content, which can be used as such or recovered as a by-product.

The process of the present invention in its continuous, autogenously heated embodiment is also advantageous in requiring little or no externally provided energy. This feature allows the process to exhibit high energy efficiency per unit of metal recovered.

The invention will be further described in the following Examples, which should be considered illustrative and not limiting.

EXAMPLE 1

A series of batch tests was run to demonstrate the effect of temperature on the extent of coke oxidation and vanadium extraction. A 10 gpl slurry of coke assaying 80 wt. % carbon and 10 wt. % vanadium (as $V_2O_5$) of which over 90% was $V_2O_3$ was digested in a 75 gpl $Na_2CO_3$ slurry under 300 psig $O_2$ for two hours. The results appear in Table 1.

TABLE 1

| Temp., °C. | Coke Weight Loss, % | $V_2O_5$ Extraction % |
|---|---|---|
| 200 | 40 | 99.5 |
| 230 | 91 | 99.3 |
| 250 | 97 | 99.7 |
| 270 | 97 | 99.9 |

EXAMPLE 2

Another series of batch tests was run to show the effect of $Na_2CO_3$ concentration and oxygen supply on the extent of coke oxidation and vanadium extraction. A 100 gpl slurry of coke assaying 80 wt. % carbon and 10 wt. % vanadium (as $V_2O_5$) of which over 90% was $V_2O_3$ was digested for two hours. The $Na_2CO_3$ concentration is the average of beginning and final concentrations, which differ because of evaporation of water. The results appear in Table 2.

TABLE 2

| $Na_2CO_3$ gpl | Temp. °C. | $O_2$ psig | Coke Weight Loss % | $V_2O_5$ Extraction % |
|---|---|---|---|---|
| 50 | 250 | 300 | 86 | 96 |

TABLE 2-continued

| $Na_2CO_3$ gpl | Temp. °C. | $O_2$ psig | Coke Weight Loss % | $V_2O_5$ Extraction % |
|---|---|---|---|---|
| 90 | 250 | 300 | 97 | 97 |
| 60 | 270 | 220 | 96 | 95 |
| 160 | 270 | 220 | 97 | 97 |

EXAMPLE 3

A third series of batch tests was run to show the effect of the solids content of the feed slurry at various $Na_2CO_3$ concentrations on the extent of coke oxidation and vanadium extraction. A coke slurry assaying 80 wt. % carbon and 10 wt. % vanadium (as $V_2O_5$) of which over 90% was $V_2O_3$, was digested at 250° C. under 300 psig $O_2$ for two hours. The results appear in Table 3.

TABLE 3

| Initial Coke, gpl | $Na_2CO_3$, gpl Initial (Final) | Coke Weight Loss % | $V_2O_5$ Extraction % |
|---|---|---|---|
| 10 | 75 (74) | 97 | 99.7 |
| 100 | 90 (73) | 97 | 97 |
| 150 | 75 (125) | 91 | 94 |
| 200 | 75 (70) | 22 | 93 |

EXAMPLE 4

A batch test was run to demonstrate the effect of iron in petroleum coke on the extraction yield when the coke is digested in a solution containing a relatively high concentration of vanadate, as is encountered in continuous operation. A sample of petroleum coke assaying 78.7 wt. % carbon, 14.2 wt. % vanadium (as $V_2O_5$) of which over 90% was $V_2O_3$, 2.2 wt. % S, and 0.43 wt. % Fe was ground to a particle size of $-100$ mesh and slurried in a solution containing 85 gpl sodium carbonate to form a slurry having a solids content of 25 gpl. The initial slurry contained no vanadate in solution in Run 4A, and 97 gpl vanadate (as $V_2O_5$) in Run 4B. Each slurry was digested at 275° C. under 300 psig $O_2$ for two hours. Table 4 shows the initial and final vanadate concentrations, the initial and final sodium sulfate concentrations, and the extraction. In each run the final sodium carbonate concentration was 80 gpl. The decrease in vanadium extraction in Run 4B was due to the formation of insoluble iron-vanadate compounds in the digestion residue.

TABLE 4

|  | 4A | 4B |
|---|---|---|
| Initial Vanadium Conc. (as gpl $V_2O_5$): | 0 | 97 |
| Initial $Na_2SO_4$ Conc. (gpl): | 0 | 90 |
| Final Vanadium Conc. (as gpl $V_2O_5$): | 4 | 100 |
| Final $Na_2SO_4$ Conc. (gpl): | 2 | 92 |
| Extraction (%): | 98.4 | 91 |

EXAMPLE 5

Three sets of digestion conditions exemplifying the continuous embodiment of the process of the present invention are determined for a coke sample containing 4.1 wt. % $V_2O_3$, 85 wt. % C, 2.2 wt. % S, 1.1 wt. % NiO, and 0.1 wt. % Fe. The coke has a fuel value of 7100 kcal/kg. The coke is fed to a pressure autoclave at a rate of 4500 kg coke/hr slurried in an aqueous solution of sodium carbonate such that 690 kg $Na_2CO_3$/hr is fed to the reactor. The slurry solids content is 8.3 wt. % solids, and the slurry temperature is 30° C. Air is fed to the autoclave at a rate of 45,000 kg/hr. The autoclave is operating at 304° C. and a total pressure of 176 kg/cm². Carbonaceous material in the coke is essentially totally oxidized to gaseous oxides of carbon having a ratio of about 12 moles of $CO_2$ for each mole of CO. The vent gas flow rate is 93,800 kg/hr, of which about 0.4 vol. % is $O_2$.

Digestion at each set of temperatures and total autoclave pressures shown in Table 5 produces a sodium vanadate liquor assaying about 50 gpl of vanadium as $V_2O_5$, 108 gpl $Na_2SO_4$, and about 60 gpl $Na_2CO_3$. Liquor is withdrawn at about 4960 kg/hr. Slurried in the liquor is a digestion residue (about 440 kg/hr) assaying about 16.7 wt. % $NiCO_3$, about 5.2 wt. % vanadium (as $V_2O_5$), about 1 wt. % Fe, and the remainder inert material. Gas is withdrawn from the digestion reactor at about 94,000 kg/hr, of which about 45,000 kg/hr comprises high-pressure steam. The extraction of vanadium from the coke into the vanadate liquor is about 90.9% complete, and about 92% of the water fed in the slurry is converted to steam.

TABLE 5

| Run | Total Pressure kg/cm² | Digestion Temp. °C. |
|---|---|---|
| 5A | 140 | 290 |
| 5B | 176 | 304 |
| 5C | 230 | 320 |

EXAMPLE 6

This Example demonstrates the determination of the relationship between the feed temperature and feed solids content.

If the feed stream shown in Example 5 has instead a solids content of 8 wt. % solids, digestion under the conditions shown in Run 5B of Example 5 would form a product liquor containing only 26 gpl of vanadate (as $V_2O_5$) and also containing 56 gpl $Na_2SO_4$, 60 gpl $Na_2CO_3$, and a total of 8980 kg/hr of liquor. If the inlet temperature of this more dilute feed stream is raised to 55° C., digestion at 305° C. and 176 kg/cm² would form 4960 kg/hr of a product liquor containing 50 gpl vanadate (as $V_2O_5$), 108 gpl $Na_2SO_4$, and 95,900 kg/hr of vent gas of which about 47,000 kg/hr is steam.

What is claimed is:

1. A process for recovering vanadium and nickel values from petroleum coke comprising carbonaceous matter assaying at least about 50 wt. % carbon and also containing vanadium, at least a portion of which is in an oxidation state no higher than trivalent, iron, in an amount less than about 10% by weight of the vanadium as $V_2O_5$, and nickel values, as well as one or more compounds of sulfur, comprising
   (a) establishing a slurry of the coke in an aqueous solution of sodium carbonate in an amount to provide an excess of sodium over the stoichiometric amount for formation of $NaVO_3$ and $Na_2SO_4$,
   (b) digesting the slurry in an autoclave at a digestion temperature of about 250° C. to about 320° C. under an oxygen overpressure comprising at least the stoichiometric amount of oxygen for oxidation of the vanadium in the trivalent or lower oxidation state to the pentavalent state, to form an aqueous sodium vanadate liquor containing at least about 75% of the vanadium values fed in the slurry and a digestion residue containing vanadium, iron, and nickel values as well as any unoxidized carbonaceous matter,
   (c) separating the sodium vanadate liquor from the digestion residue,
   (d) leaching the digestion residue with an aqueous solution of an alkali metal compound selected from the group consisting of carbonates and hydroxides to produce a vanadate leach liquor and a first leach residue,
   (e) filtering the vanadate leach liquor from the first leach residue,
   (f) leaching the first leach residue with an aqueous solution of a mineral acid having a pH value between about 3 and about 6 to produce a nickel leach liquor and a second leach residue, and
   (g) filtering the nickel leach liquor from the second leach residue.

2. A continuous process for recovering vanadium and nickel values from a petroleum coke comprising carbonaceous matter assaying at least about 50 wt. % carbon and having a fuel value of at least about 5000 kcal/kg of coke and also containing vanadium, at least a portion of which is in an oxidation state no higher than trivalent, iron, in an amount less than about 10% by weight of the vanadium as $V_2O_5$, and nickel values, as well as one or more compounds of sulfur, comprising
   (a) establishing a slurry of the coke in an aqueous solution of sodium carbonate in an amount to provide an excess of sodium over the stoichiometric amount for formation of $NaVO_3$ and $Na_2SO_4$,
   (b) feeding the slurry to an autogenously heated autoclave to which oxygen-bearing gas is fed and from which an off-gas stream containing water vapor and oxides of carbon is withdrawn to provide in the autoclave an oxygen overpressure of about 0.07 kg/cm to about 70 kg/cm- and a given total pressure of about 40 kg/cm² to about 200 kg/cm²,
   (c) digesting the slurry in said autoclave at a digestion temperature of about 250° C. to about 320° C. to oxidize at least a portion of the carbonaceous matter in the slurry to form gaseous oxides of carbon and to oxidize the vanadium in the trivalent or lower state to the pentavalent state, thereby dissolving at least about 75% of the vanadium values in the coke as a sodium vanadate liquor and forming a digestion residue containing vanadium, iron, and nickel values as well as any unoxidized carbonaceous matter,
   wherein said digestion temperature is substantially inversely correlated to the gas flow rate and substantially directly correlated to the total pressure,
   and wherein the digestion temperature is adjusted by adjusting the solids content of the slurry established in step (a) to about 10 to about 300 grams of solids per liter of slurry and adjusting the temperature of the slurry established in step (a) to about 5° C. to about 95° C., wherein said slurry temperature is substantially inversely correlated to the slurry solids content, to convert at least about 50% of the water fed in the slurry to steam and to provide that the sodium vanadate liquor contains about 20 gpl to about 100 gpl of vanadium as $V_2O_5$, (d) separating the sodium vanadate liquor from the digestion residue, (e) leaching the digestion residue with an aqueous solution of an alkali metal compound selected from the group consisting of carbonates and hydroxides to produce a vanadate leach liquor and a first leach residue, (f) filtering the vanadate leach liquor from the first leach residue, (g) leaching the first leach residue with an aqueous solution of a mineral acid having a pH value between about 3 and about 6 to produce a nickel leach liquor and a second leach residue, and (h) filtering the nickel leach liquor from the second leach residue.

3. The process of claim 1 or claim 2 wherein the sodium vanadate liquor produced during digestion is flashed to the atmosphere to provide a high-temperature stream of water vapor and steam and to increase the concentration of vanadium in the sodium vanadate liquor by at least about 10% of the concentration prior to flashing.

4. The process of claim 1 or claim 2 wherein the digestion residue is leached with an aqueous solution of an alkali metal compound selected from the group consisting of hydroxides and carbonates and the pH of the solution is maintained at a value such that vanadate dissolves in the solution and nickel and iron values are rejected from solution.

5. The process of claim 1 or claim 2 wherein at least about 50% of the vanadium in the petroleum coke residue is in an oxidation state no higher than trivalent.

6. The process of claim 1 or claim 2 wherein the vanadate leach liquor formed by leaching the digestion residue is recycled to step (a).

7. The process of claim 1 or claim 2 wherein the sodium vanadate liquor formed in the digestion stage contains at least about 90% of the vanadium values fed in the slurry.

8. The process of claim 1 or claim 2 wherein at least about 75% of the water fed to the autoclave is converted to steam.

* * * * *